(12) United States Patent
Mayer et al.

(10) Patent No.: US 7,151,434 B2
(45) Date of Patent: Dec. 19, 2006

(54) METHOD AND SYSTEM FOR DATA TRANSMISSION BETWEEN A PACKAGE MAILBOX AND AT LEAST ONE CENTRAL DATA PROCESSING UNIT IN A LOGISTIC SYSTEM

(75) Inventors: Boris Mayer, Bonn (DE); Johannes Schommers, Bonn (DE)

(73) Assignee: Deutsche Post AG, Bonn (DE)

( * ) Notice: Subject to any disclaimer, the term of this patent is extended or adjusted under 35 U.S.C. 154(b) by 0 days.

(21) Appl. No.: 10/524,947

(22) PCT Filed: Aug. 7, 2003

(86) PCT No.: PCT/DE03/02693

§ 371 (c)(1),
(2), (4) Date: Feb. 15, 2005

(87) PCT Pub. No.: WO2004/018116

PCT Pub. Date: Mar. 4, 2004

(65) Prior Publication Data

US 2005/0288977 A1  Dec. 29, 2005

(30) Foreign Application Priority Data

Aug. 16, 2002 (DE) .............................. 102 38 344

(51) Int. Cl.
*H04B 1/00* (2006.01)
(52) U.S. Cl. .................... 340/5.73; 340/568.1
(58) Field of Classification Search ............. 340/5.73, 340/5.7, 5.9, 568.1, 572.1, 569, 539.1, 543; 700/233, 244, 214, 237, 242; 235/382, 385, 235/381; 232/45, 19
See application file for complete search history.

(56) References Cited

U.S. PATENT DOCUMENTS 5,051,914 A   9/1991  Sansone et al. ............. 364/478
5,068,797 A   11/1991 Sansone et al. ............. 364/478
5,072,401 A   12/1991 Sansone et al. ............. 364/478
5,774,053 A * 6/1998  Porter ....................... 340/568.1
6,344,796 B1* 2/2002  Ogilvie et al. ........... 340/568.1

FOREIGN PATENT DOCUMENTS

DE   100 00 830 A1   7/2001
DE   201 03 584      8/2001
WO   WO 96/20952 A2  7/1996
WO   WO 96/20952 A3  7/1996

OTHER PUBLICATIONS

International Search Report in PCT/DE03/02693 dated Feb. 26, 2004.
International Preliminary Examination Report in PCT/DE03/02693 dated Nov. 22, 2004.

(Continued)

*Primary Examiner*—Wendy R. Garber
*Assistant Examiner*—William Bangachon
(74) *Attorney, Agent, or Firm*—Marshall, Gerstein & Borun LLP

(57) ABSTRACT

A method and system for data transmission between a package mailbox and at least one central data processing unit in a logistic system for the operation of one or more package mailboxes. Events at a package mailbox are evaluated by means of a communication device, which transmits function requests corresponding to the events to the data processing unit. The data processing unit carries out the corresponding functions and optionally returns data to the communication device of the package mailbox.

4 Claims, 20 Drawing Sheets

OTHER PUBLICATIONS

"Prozessrechentechnik, Kapitel 2", Georg Faerber, Springer Verlag, 1979, pp. 3-30.
"Programming Web Services with XML-RPC", St. Laurent et al., Sebastopol, CA 2001, 1 page.
ONC Remote Procedure Call (oncrpc), http://www.ietf.org/html.charters/oncrpc-charter.html, May 9, 2003, 1 page.
"Simple Object access Protocol (SOAP) 1.1", http://www.w3org/TR/SOAP, Sep. 17, 2003, 33 pages.

* cited by examiner

METHOD AND SYSTEM FOR DATA TRANSMISSION BETWEEN A PACKAGE MAILBOX AND AT LEAST ONE CENTRAL DATA PROCESSING UNIT IN A LOGISTIC SYSTEM

This is the U.S. national phase of International Application No. PCT/DE03/02693 filed Aug. 7, 2003, the entire disclosure of which is incorporated herein by reference.

BACKGROUND OF THE DISCLOSURE

1. Field of the Disclosure

The disclosure relates to a method and a system for data transmission between a parcel compartment system and at least one central data processing unit in a logistic system for the operation of one or more parcel compartment systems.

2. Related Technology

Logistic systems can be used for the distribution of letters and goods shipments (packages, parcels), transportation receptacles, pallets and containers. Here, the appertaining logistic systems preferably serve to distribute shipments between a sender and a recipient, whereby, for example, important criteria are those having to do with the transportation speed, the use of warehouses and vehicles as well as the transmission of shipment data.

In order to operate a logistic system involving multiple users, machines and one or more logistics providers, certain information has to be transmitted to the various components of the system. This includes the notification of users about events within the logistic system as well as the communication between machines and data processing centers of the system.

In particular, the operation of parcel compartment systems for registered users by one or more transportation or delivery companies calls for a logistic system with various notification and communication routes. Such parcel compartment systems or machines are operated, for example, by a postal service provider for registered users for whom a delivery agent deposits parcels or other shipments into a compartment of the system. Drop-off as well as pick-up procedures can be carried out not only by the postal service provider that operates the logistic system, but also by other companies that are granted access to components of the logistic system, including the filling of the parcel compartments.

After a parcel has been deposited for the user, he has to be notified to this effect. Moreover, the logistic system has to be informed, for example, whether a user has picked up his parcel. Moreover, information about the registration of new customers, customer data, pick-up deadlines and COD amounts has to be exchanged within the logistic system.

In addition to notifications of the users of the system, there also has to be communication between the parcel compartment systems and other components of the logistic system. This includes, for example, communication with data processing centers of the postal service provider that operates the parcel compartment systems.

The communication between one or more parcel compartment systems and at least one data processing center encompasses the transmission of information about certain events. These events include, for instance, drop-off and pick-up procedures by different groups of people. This communication also comprises the transmission of information that is needed for the operation of the machines. This includes, for example, filling states, user data, identification codes, compartment data and payment information.

In order to process information, process control computer systems with process control computers are known in which external events trigger a response by the process control computer. Examples of industrial applications for the use of process control computers are the control of machines, the automation of processes, the acquisition of operating data and quality control.

German Utility Model 201 03 584 U1, for example, discloses a system for delivering and receiving shipments which is particularly suitable for e-commerce. The system comprises several automatic delivery machines (ADM) into which shipments are deposited and from which they are picked up. The system also comprises a LAMIS server-computer program for handling the operations of the system.

U.S. Pat. No. 5,051,914 describes a system for creating batches of mail for which a postal service provider grants a postage discount to a customer on the basis of certain criteria. For example, a discount is granted for presorted mailings. The system provides that a central data processing unit is connected to several customer stations at which users generate mailings. The data processing unit receives shipment information from the individual stations which the central unit then processes in such a way that mail batches fulfill the requirements of an envisaged postage discount when they are dropped off at a mail processing station.

U.S. Pat. No. 5,068,797 likewise discloses a system for optimizing the shipment of mail batches. In an embodiment of the system, it is possible, for example, that information is transmitted from the data processing unit to a processing station by e-mail. On the basis of the information, the mailings can be printed out and processed. In this case, the processing station is located near a mail depot so that the generated mailings can be dropped off directly at the depot. This eliminates the need for the transportation of mailings from a user to the processing station.

U.S. Pat. No. 5,072,401 discloses a system for the controlled drop-off of mailings in which a postage discount is likewise granted to a user under certain conditions. The system is supposed to bring about savings in terms of the transportation and sorting procedures without entailing additional effort for the sender. Since the senders cannot at all times be aware of all of the requirements for receiving postage discounts, the mailing information is processed in a central data processing unit.

WO 96/20952 A2 discloses a system for pre-processing documents. Within the system, at an administrator, there is a central computer that has a storage medium comprising at least three different storage areas. The storage areas can each be used by registered database users in order to store templates, documents or responses.

SUMMARY OF THE DISCLOSURE

The disclosure provides a method for data transmission between a parcel compartment system and at least one central data processing unit within a logistic system for the operation of one or more parcel compartment systems that ensures effective communication between the components. In this context, the logistic system should be able to comprise one or more transportation and delivery companies that have access to the compartments of the parcel compartment system and the logistic system should comprise one or more registered users.

Moreover, the disclosure provides a system for carrying out the method.

According to the disclosure, events at the parcel compartment system are evaluated by a communication device, after which said communication device transmits function messages associated with the events to the data processing unit, whereby the data processing unit carries out the corresponding functions and, if applicable, sends data back to the communication device of the parcel compartment system.

The disclosure also provides a system for carrying out the method.

A description will be given below of especially preferred embodiments of method sequences of the communication procedure, which can be implemented particularly advantageously in such a logistic system including one or more parcel compartment systems and at least one data processing unit.

BRIEF DESCRIPTION OF THE DRAWINGS

Advantages, special features and advantageous embodiments of the disclosed method and system follow from the following description of preferred embodiments making reference to the drawing figures.

The drawings show the following.

DETAILED DESCRIPTION OF PREFERRED EMBODIMENTS

Figure 1:
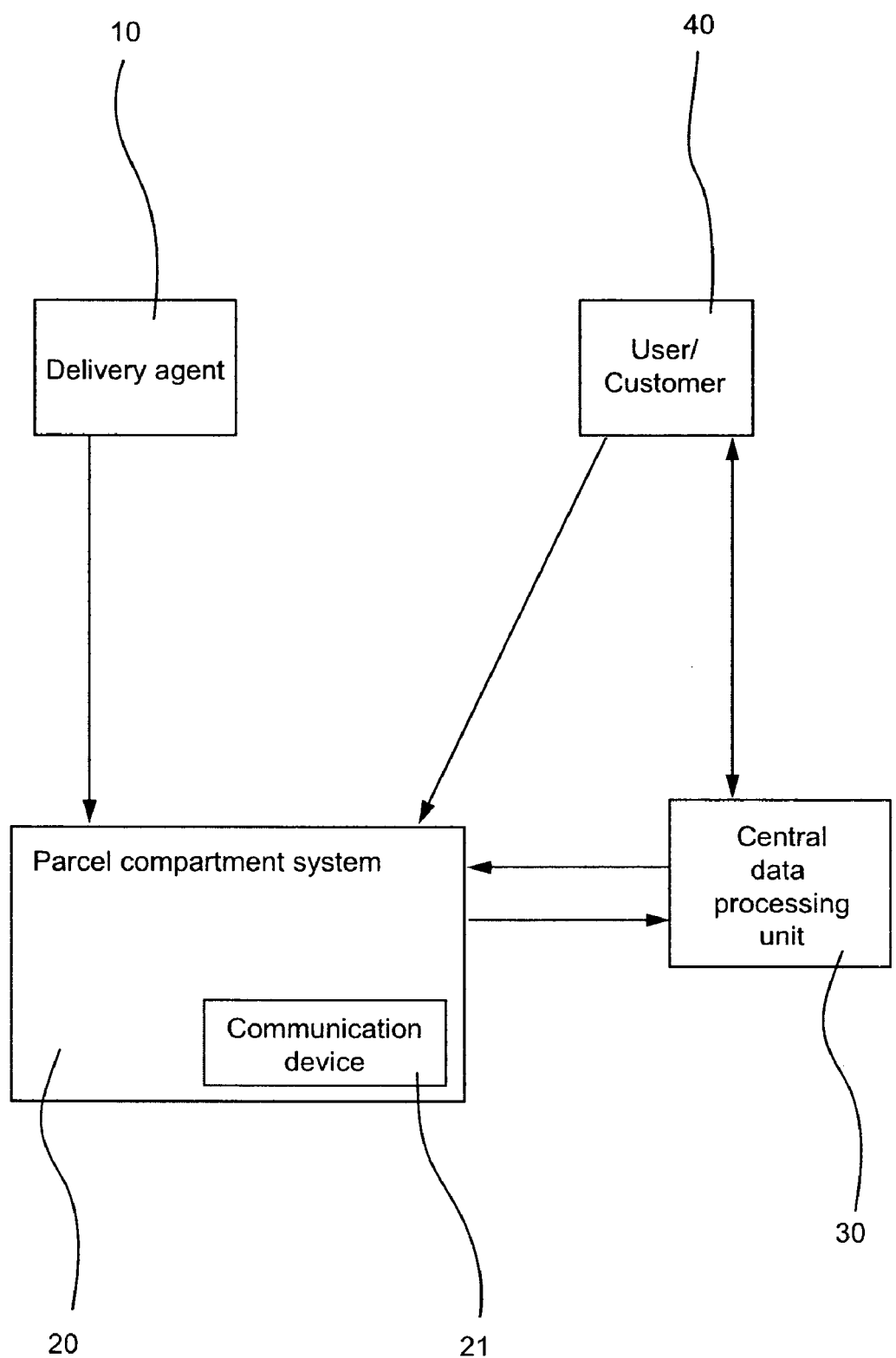
FIG. 1—a schematic depiction of data transmission within a logistic system for the operation of parcel compartment systems.

Especially preferred embodiments will be described on the basis of the drawing figures and description.

The disclosure relates to the communication sequences during the exchange of information between a parcel compartment system and at least one central data processing unit of a logistic provider. Such parcel compartment systems or machines are operated, for example, by a postal service provider for registered users for whom a delivery agent deposits parcels or other shipments into a compartment of the system. Drop-off as well as pick-up procedures can be carried out not only by the postal service provider that operates the logistic system but also by other affiliated companies that are granted access to components of the logistic system, including the filling of the parcel compartments.

The central data processing unit is designated as P24B in the drawings of the figures, whereas the parcel compartment system is marked as M. These parcel compartments of the system can have different configurations. They preferably have one or more areas for depositing shipments, whereby the areas can be configured as individual lockable compartments or as continuous elevator cages that can be positioned by a transport mechanism in front of at least one lockable opening.

Basically, the communication sequences according to the disclosure look like this:

1. Activities by delivery agents, customers or a timer at the parcel compartment system are events that trigger the transmission of function messages to the central data processing unit. A communication device of the parcel compartment system evaluates the events and associates them with the appertaining function messages. A function message is present, for example, in the form of an XML file that is transmitted via an http post request. However, other formats can also be used. In an especially preferred embodiment, the function message consists of a function name and a set of parameters.

2. The central data processing unit responds with an XML file. This XML file contains the result of the function message. The result of the function message is a status code that indicates the success or failure of the execution of the function. If the parcel compartment system expects to receive data in return, the data processing unit transmits the requested data (only if the execution of the function was successful).

3. If necessary, the parcel compartment system stores the data that is are sent back by the data processing unit.

It has proven to be advantageous for the communication device of the parcel compartment system to collect events and data for later transmission to the data processing unit. Several function messages are then combined into one single request. A request can contain one or more function messages.

The following table shows examples of various user roles within a logistic system. Each user of a parcel compartment system can assume one of these roles. The role determines the access rights to the system (parcel compartment systems and central data processing unit). The system uses role identifiers (role ID) when it provides the parcel compartment system with user profiles. The designation DPAG, which stands for Deutsche Post AG, describes an example of a provider that operates a logistic system with parcel compartment systems. The designation B2B refers to a business-to-business system in which companies have access to compartments of the parcel compartment systems of the system operator. The designation Post24 stands for an example of a central data processing unit of the operating company.

| Role ID | Role |
|---------|------|
| 1 | DPAG recipient |
| 2 | DPAG delivery agent |
| 3 | B2B recipient |
| 4 | B22 delivery agent |
| 5 | Post24 Master |
| 6 | Technician |
| 7 | Service employees (cleaning personnel, etc.) |

The communication sequences between the parcel compartment systems and the central data processing unit are explained with reference to FIGS. 1 to 20.

The drawing in FIG. 1 schematically describes the sequences within a logistic system that includes one or more parcel compartment systems 20, each with a communication device 21, with at least the central data processing unit 30, with various delivery agents 10 and with various users 40. The users are preferably registered users of the system. The delivery agents as well as the users have access to certain areas of the parcel compartment system as a function of the determination of their specific authorization. Such instances of access are, for example, events that are evaluated by the communication device 21 of the parcel compartment system in question. The communication device associates the appertaining function messages with the events and sends them to the central data processing unit 30. In this process, it is advantageous that additional data such as status codes and request IDs are transmitted.

When the central data processing unit 30 receives the function message, an appertaining status code to confirm receipt is sent to the communication device 21. It also carries out the appertaining function and, if applicable, sends data back to the communication device. In some cases, it is necessary to provide a registered user with information about the event at the parcel compartment system. For example, if a parcel is deposited for him, the central data processing unit triggers a notification containing, for example, the location of the parcel compartment system, access codes or other information.

Figure 2:
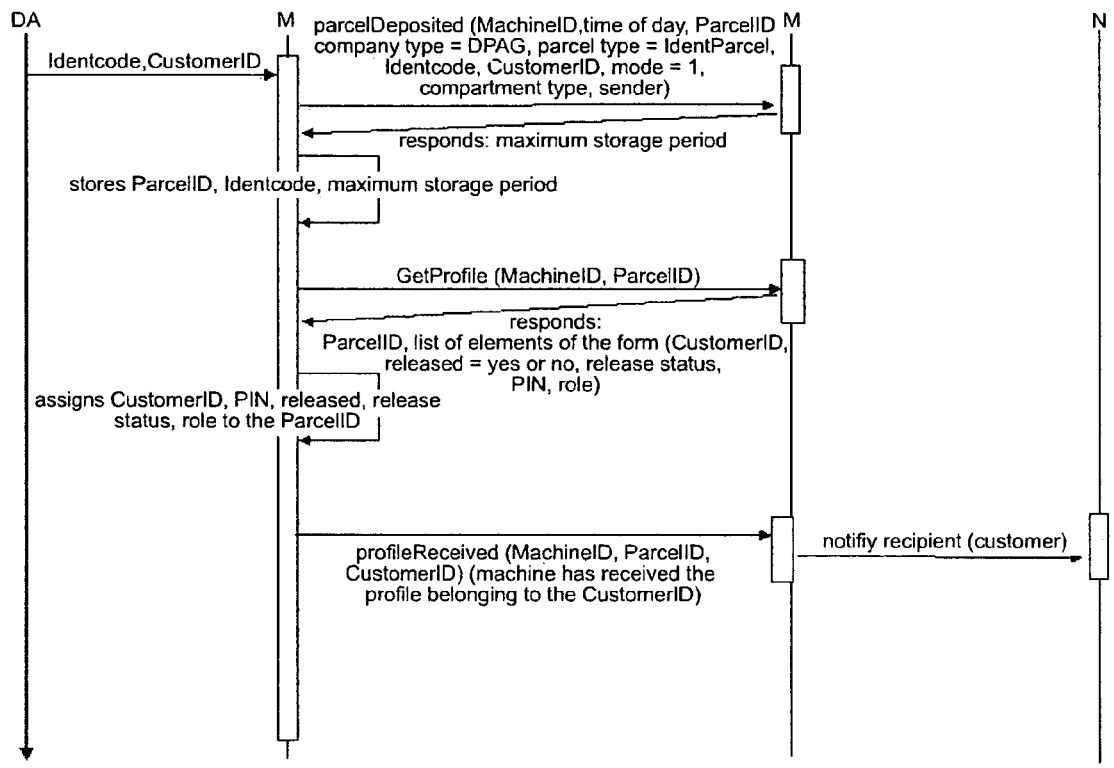
FIG. 2—the communication sequences during the delivery of a parcel by a delivery agent without an associated payment procedure.

The communication sequence shown in FIG. 2 uses arrows to describe the sequences during the delivery of a parcel to a parcel compartment system 20 (M, machine) by a delivery agent 10 (DA, Delivery Agent) without Cash on Delivery (COD), that is to say, without a payment procedure associated with the delivery. The central data processing unit 30 is designated as P24B and the users/customers 40 are designated as N.

The delivery agent 10 logs in at the communication device 21 of the parcel compartment system 20 and, in this case, deposits a parcel of the system operator. Preferably, data located on the parcel are read in during this procedure. Such data include, for example, an Identcode of the system operator that is assigned to the parcel and which is scanned in. Moreover, a CustomerID can be read in. Through this event of depositing, communication is triggered back and forth between the communication device of the parcel compartment system and the central data processing unit. The communication device 21 evaluates the event and associates a function message with it. The function message is transmitted to the central data processing unit and on this basis, the central data processing unit carries out the appropriate functions and, if applicable, sends data back to the communication device. The function messages can be transmitted individually or in batches. For example, the communication device transmits data such as the MachineID, the point in time of the depositing, the ParcelID, the parcel type, an Identcode, a CustomerID, various modes, the compartment type and the sender. Moreover, a company type can be transmitted. This is advantageous if the parcel compartment system is used by several transportation and delivery companies that have access to certain compartments of the parcel compartment system.

The central data processing unit receives the data with the function message and sends, for example, the maximum storage period back to the parcel compartment system. The latter can then store the ParcelID, the Identcode and the maximum storage period.

The communication device of the parcel compartment system requests a profile from the central data processing unit which then transmits a customer profile.

This profile preferably contains at least a CustomerID, a release status, a PIN and the role of the customer. If more than one recipient is transmitted with this profile, then the parcel can be picked up by all of the specified persons. The parcel compartment system assigns the profile to the ParcelID and sends confirmation to the central data processing unit that the profile has been received. If the request for the customer profile is not successful, the communication device of the machine advantageously attempts another request. Only once the transmission of the profile has succeeded does the communication device send a confirmation on the basis of which, at the end of the communication, the central data processing unit sends the user a notification that a parcel has been deposited.

Figure 3:
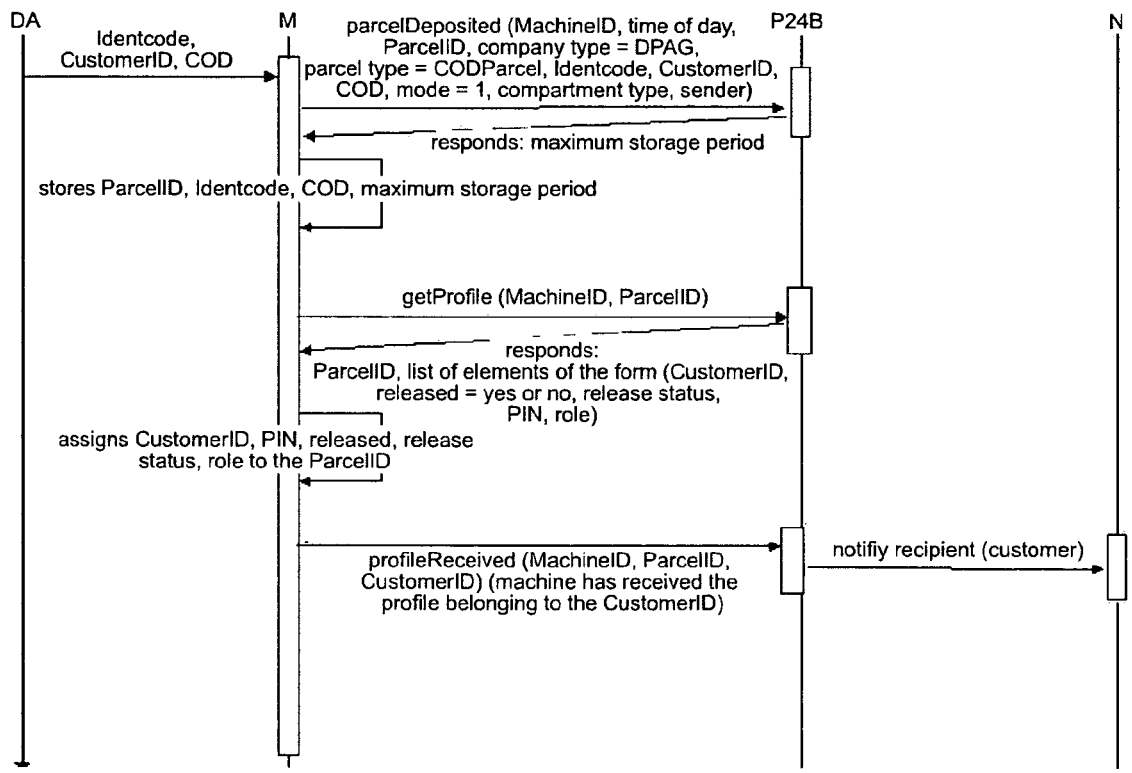
FIG. 3—the communication sequences during the delivery of a parcel by a delivery agent with an associated payment procedure.

The communication sequence in FIG. 3 describes the sequences during the delivery of a parcel to a parcel compartment system by a delivery agent with Cash on Delivery (COD), so that a payment procedure is required in conjunction with the delivery. The sequences are basically the same as the communication for a parcel without COD and are merely augmented by the element of the COD. Here, the parcel type changes from an IdentParcel to a CODParcel and the COD is read into the parcel compartment system and stored there.

Figure 4:
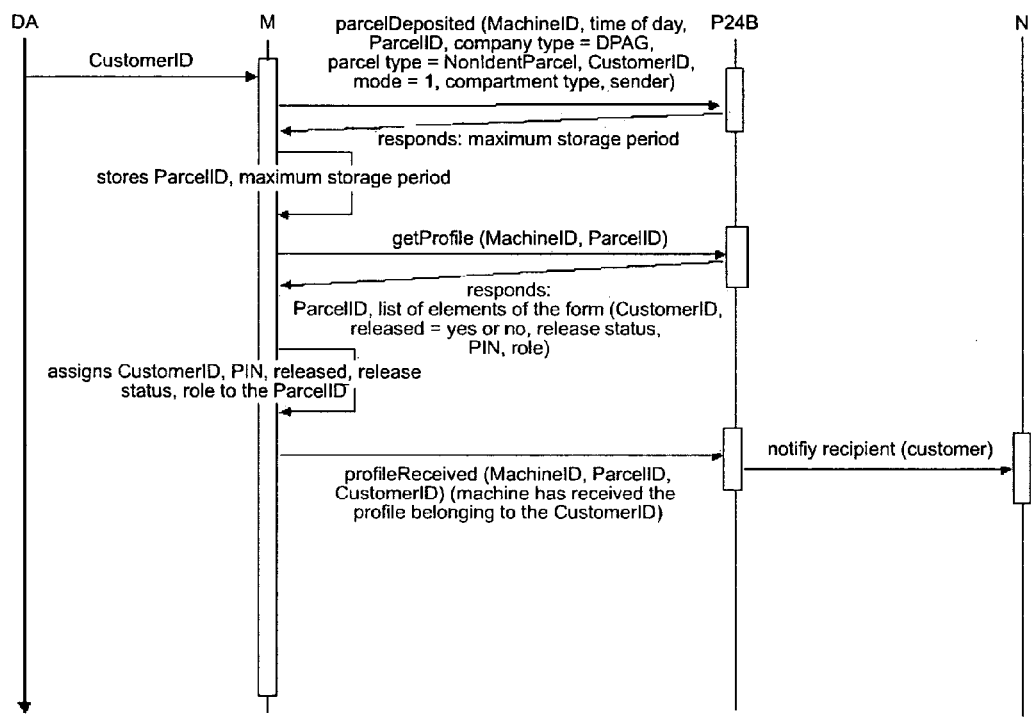
FIG. 4—the communication sequences during the delivery of a small packet by a delivery agent.

The communication sequence shown in FIG. 4 describes the communication sequences during the delivery of a small packet by a delivery agent 10 without COD, whereby the small packet does not have an Identcode, so that only the CustomerID is scanned in at the parcel compartment system. The sequences are basically the same as those of a parcel according to FIG. 2. They are merely augmented by the fact that the parcel type is designated as a NonIdentParcel.

Figure 5:
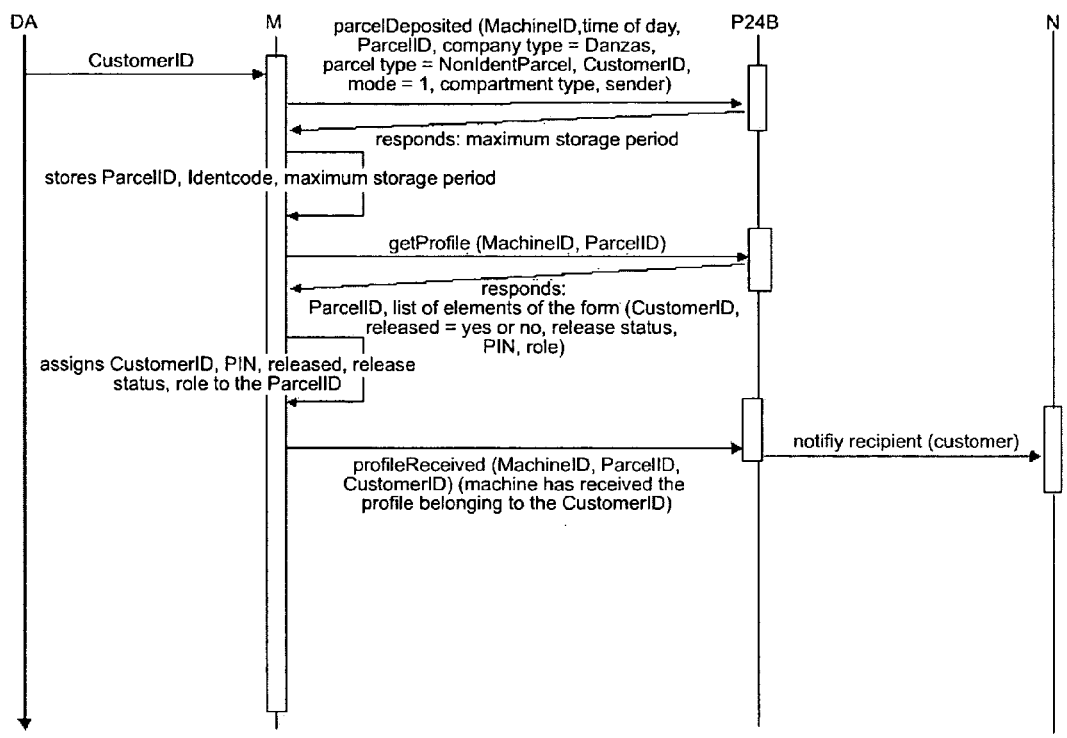
FIG. 5—the communication sequences during the delivery of a parcel by a delivery agent of a logistic provider.

The communication sequence shown in FIG. 5 describes the sequences during the delivery of a B2B parcel by a delivery agent 10, whereby the parcel is deposited by an affiliated company that is not the operating company of the logistic system. For example, that logistic system could be part of a postal service company that also uses an external transportation and delivery company such as Danzas. These parcels then likewise do not necessarily have an Identcode so that only the CustomerID is scanned in at the parcel compartment system. The parcel type is likewise designated as a NonIdentParcel whereas the sequences are basically the same as for the communication pertaining to a parcel.

Figure 6:
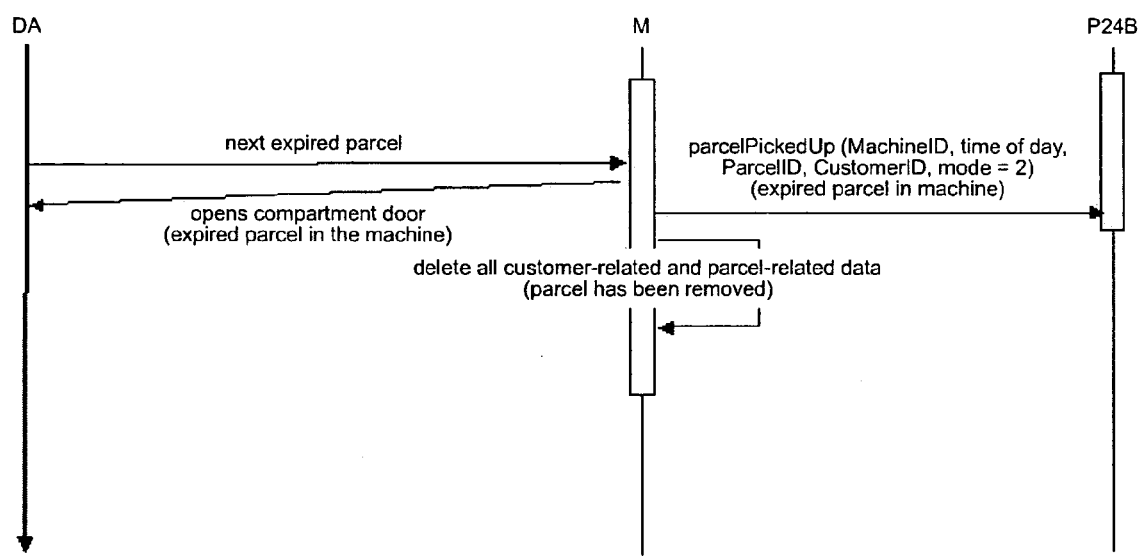
FIG. 6—the communication sequences during the removal of a parcel with an expired storage period by a delivery agent.

The communication sequence shown in FIG. 6 describes the sequences during the removal of a parcel by a delivery agent 10, whereby the storage period of the parcel has expired. The delivery agent 10 logs in and requests the next parcel with an expired storage period. If the communication device 21 finds a parcel with an expired storage period in the parcel compartment system 20, it allows the delivery agent to open the compartment in question and so that the parcel can be removed. At this time, all of the data relating to this parcel and to the appertaining customer is deleted from the parcel compartment system. The communication device sends a function message to the central data processing unit to the effect that a parcel has been removed. Then the mode is set from 1 to 2 in order to indicate that an expired parcel has been removed from the machine 20.

Figure 7:
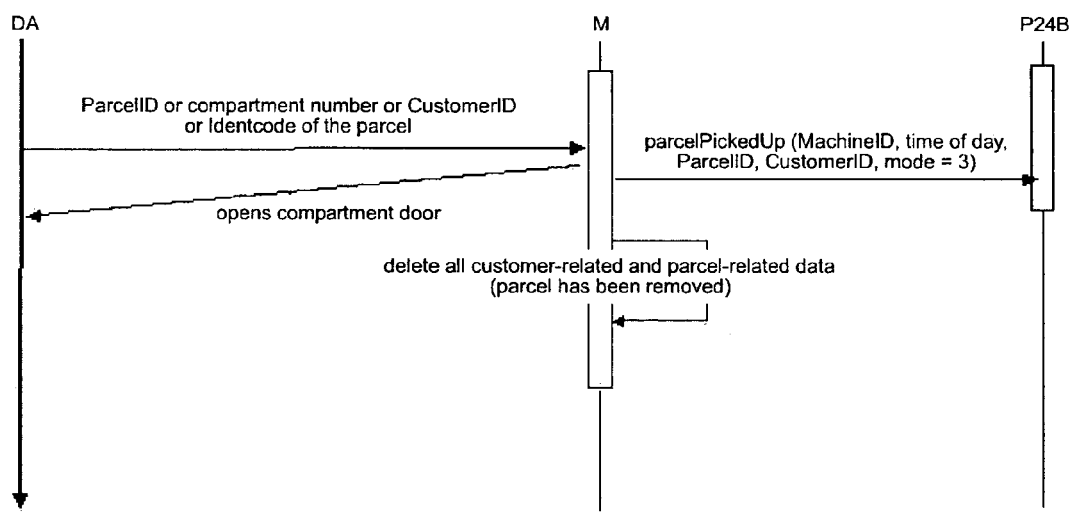
FIG. 7—the communication sequences during the unscheduled removal of a parcel by a delivery agent.

The communication sequence shown in FIG. 7 describes the sequences during the unscheduled removal of a parcel by a delivery agent 10. Here, the storage period has not expired but rather, other circumstances require the removal of the parcel. This can be the case, for example, if the parcel could not be processed by the parcel compartment system or if repair, maintenance or cleaning work are necessary.

The delivery agent logs in, whereby the ParcelID, the compartment number, the CustomerID and/or the Identcode of the parcel are read in. He removes the parcel in question, all of the customer-related and parcel-related data are deleted and the communication device 21 sends a function message to the central data processing unit to the effect that a parcel has been removed. Then the mode is set to 3 in order to indicate that there was an unscheduled removal of a parcel from the machine.

Figure 8:
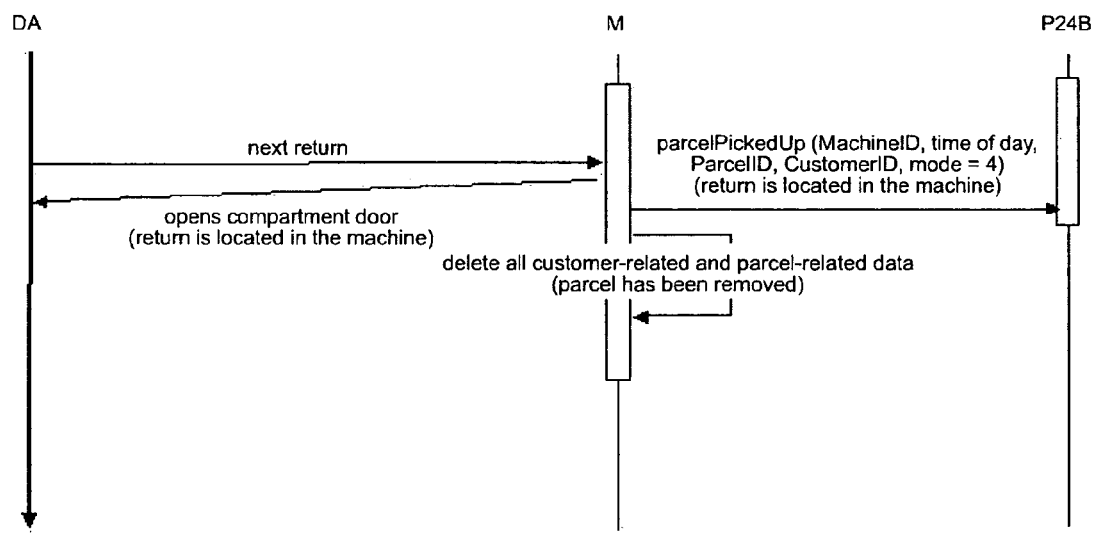
FIG. 8—the communication sequences during the delivery of a return parcel by a delivery agent.

The communication sequence in FIG. 8 describes the sequence for the removal of a return parcel by a delivery agent 10. The delivery agent logs in and requests the next return parcel. If there is a return parcel in the parcel compartment system, then he opens the appropriate compartment and removes the parcel. At this time, all of the data relating to this parcel and to the appertaining customer are deleted from the machine. The communication device 21 sends a function message to the central data processing unit to the effect that a return has been removed. Then the mode is set to 4 in order to indicate that a return parcel has been removed from the machine 20.

Figure 9:
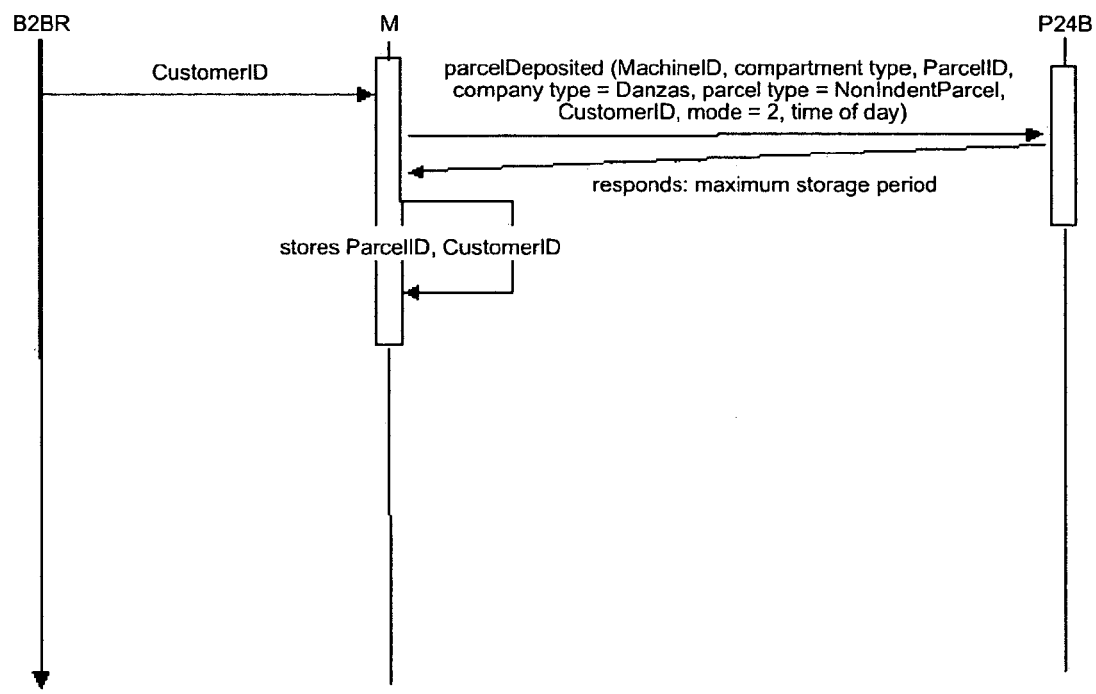
FIG. 9—the communication sequences during the delivery of a parcel by a B2B recipient.

The communication sequence shown in FIG. 9 describes the sequences during the depositing of a B2B parcel (returns) by a recipient 40 (B2B recipient, B2BR). This is the case, for example, if a recipient makes use of an external transportation and delivery company that has access to a certain number of compartments of the machine. The recipient logs in with his CustomerID and places the parcel into a compartment of the parcel compartment system. The communication device 21 transmits to the central data processing unit a function message with the MachineID, the compartment type, the ParcelID, the company type, the parcel type, the CustomerID, the mode and the point in time of the placement. The parcel type is a NonIdentParcel if the parcel does not have an Identcode of the system operator (e.g. postal service provider DP) and the mode is 2.

Figure 10:
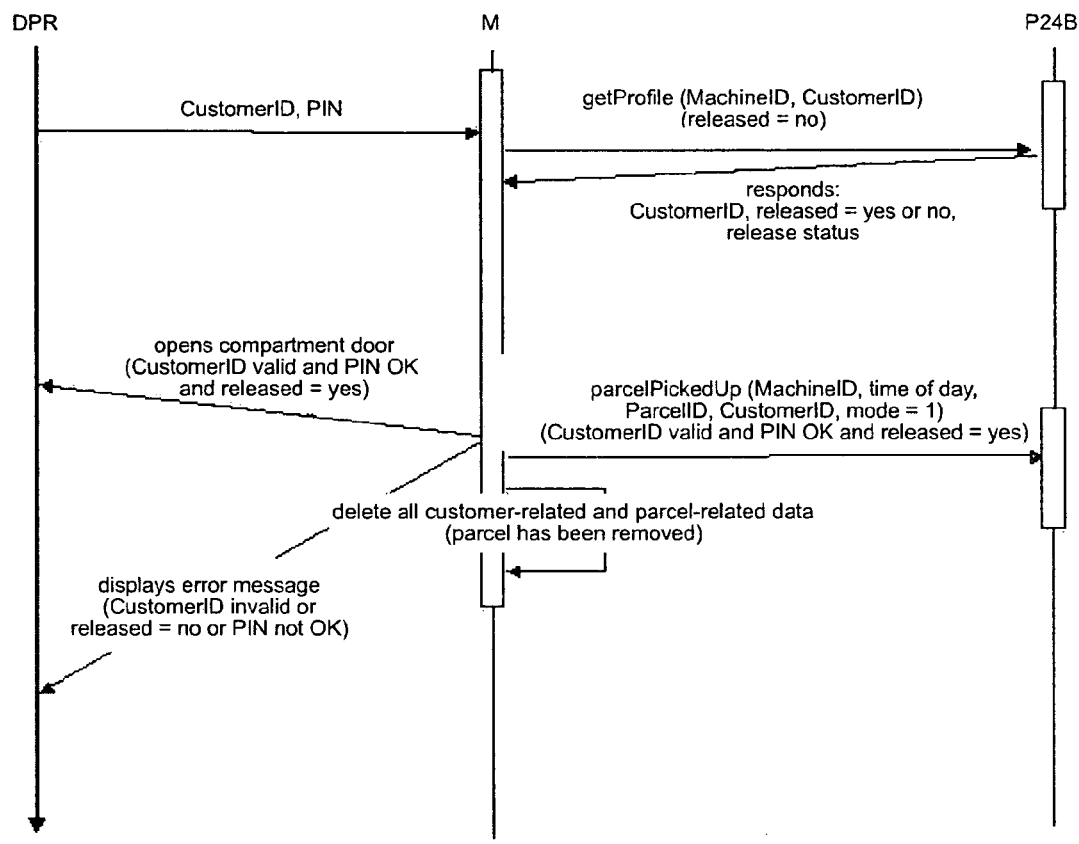
FIG. 10—the communication sequences during the pick-up of a parcel or small packet by a recipient without an associated payment procedure.

The communication sequence shown in FIG. 10 describes the sequences during the pick-up of a parcel of the system operator by a recipient 40 (DPE). The system operator can be, for example, a company such as Deutsche Post AG, so that such a recipient is designated as DPE in the figures. The recipient 40 logs in with his CustomerID and a pick-up PIN, after which the communication device 21 sends a function message to the central data processing unit in order to request a profile. As its response, the central data processing unit transmits the release status, among other things. If the release status is positive and if the CustomerID as well as the PIN are valid, the appropriate compartment can be opened and the recipient can remove his parcel. The machine 20 sends to the central data processing unit the appertaining data as well as the information that a parcel has been picked up and all of the customer-related and parcel-related data are deleted from the machine. If either the release status is negative or if the CustomerID and/or the PIN are not correct, then advantageously, the recipient is shown an error message and the compartment cannot be opened.

Figure 11:
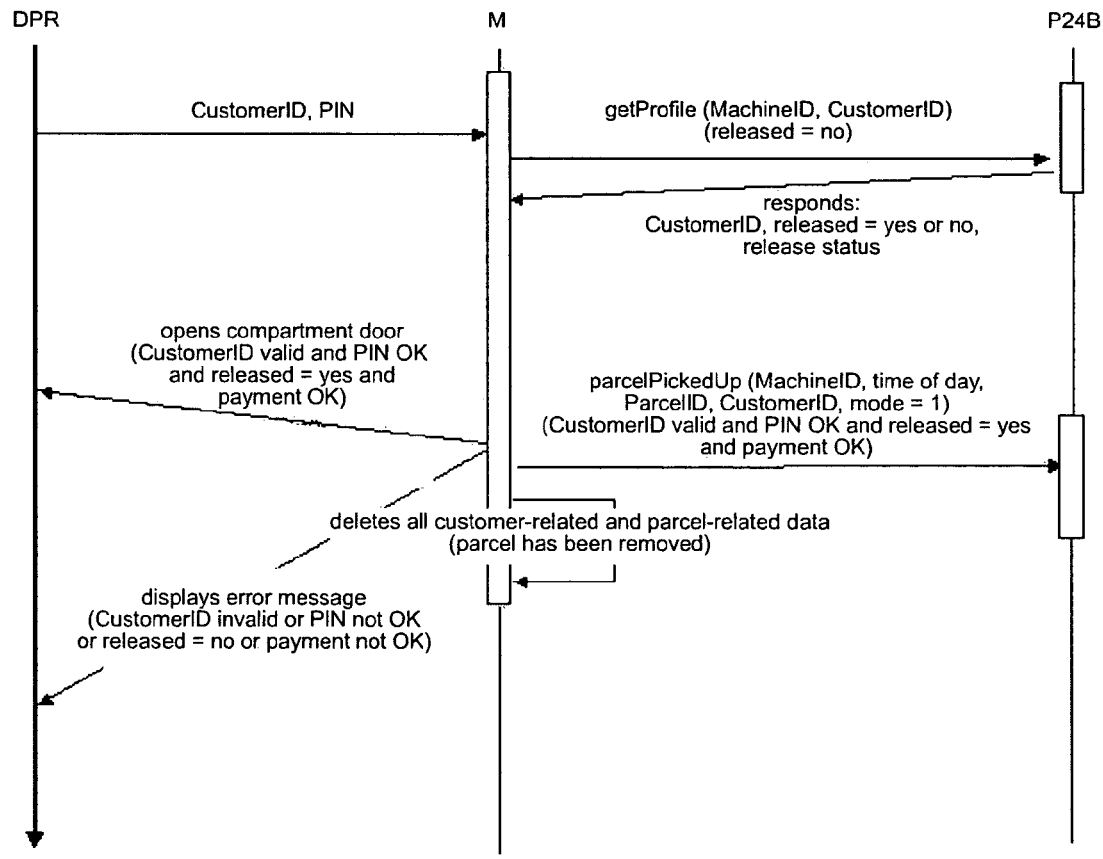
FIG. 11—the communication sequences during the pick-up of a parcel by a recipient with an associated payment procedure.

The communication sequence shown in FIG. 11 describes the sequences during the pick-up of a parcel of the system operator by a recipient 40, whereby a payment (COD) is associated with the pick-up. The compartment holding the parcel to be picked up is only opened if the account of the recipient is approved and the payment can be made.

Figure 12:
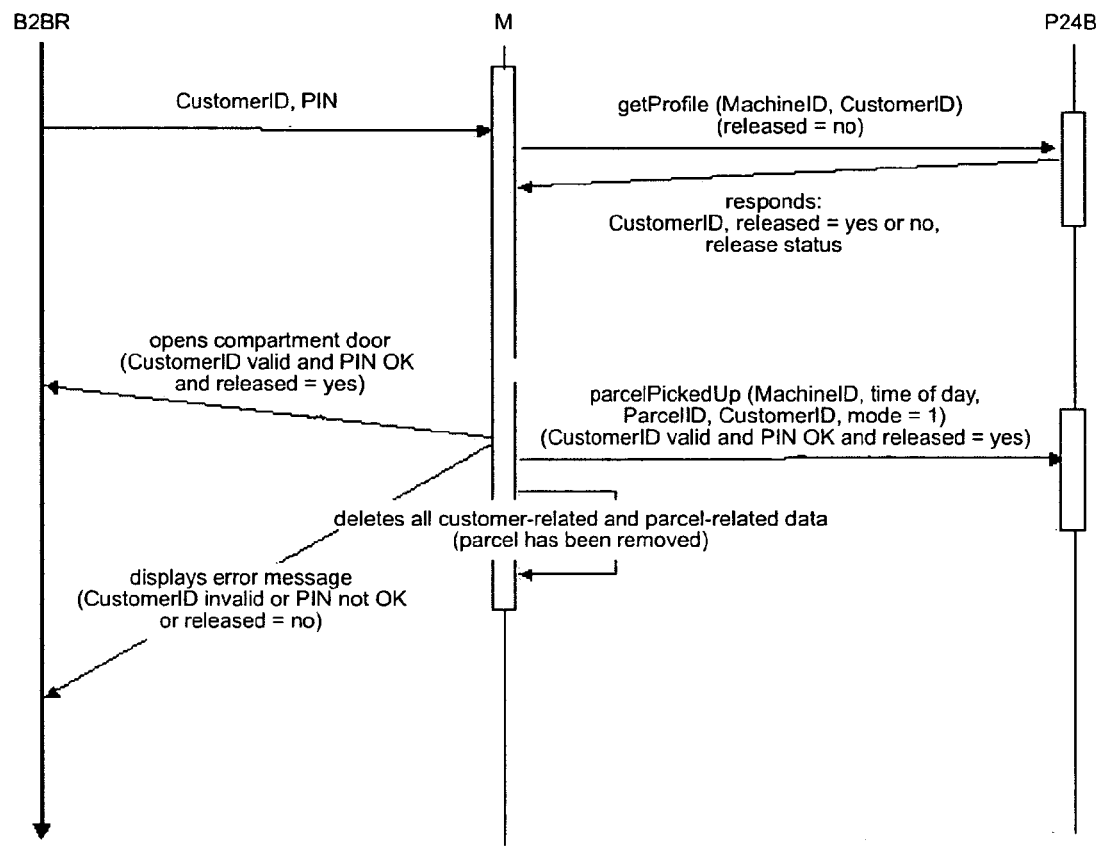
FIG. 12—the communication sequences during the pick-up of a B2B parcel by a recipient.

The communication sequence shown in FIG. 12 describes the sequences during the pick-up of a B2B parcel by a recipient (B2BE). They correspond essentially to the sequences during picking up a DP parcel according to FIG. 10.

Figure 13:
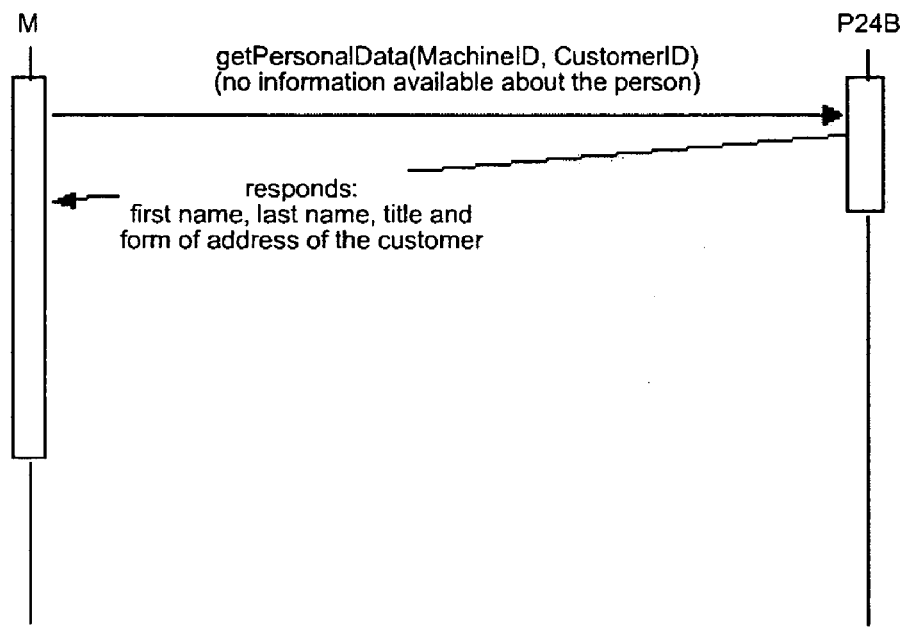
FIG. 13—the communication sequences during the retrieval of personal data.

The communication sequence shown in FIG. 13 describes the sequences during the retrieval of personal data by the communication device 21 of the central data processing unit 30. The prerequisite for such a retrieval is that there has to be a parcel for the customer in question in the parcel compartment system. In order to retrieve the data, the communication device transmits a function message containing the MachineID and the CustomerID to the central data processing unit. The latter then sends the parcel compartment system, for example, the first name, last name, title and form of address of the customer.

Figure 14:
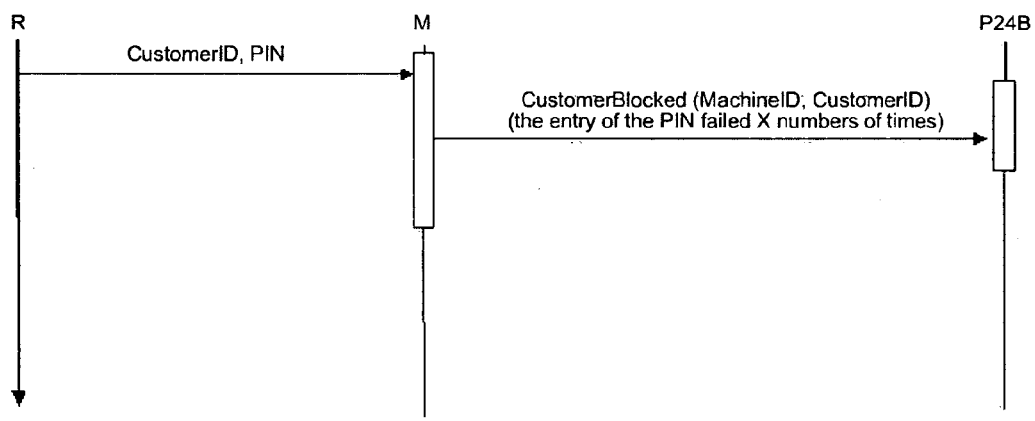
FIG. 14—the communication sequences during the blocking of accounts.

The communication sequence shown in FIG. 14 describes the sequences during the blocking of an account. An account can be blocked by the communication device, for example, if unauthorized activities were carried out at the user interface of the parcel compartment system. For instance, if the wrong PIN is entered three times, as described in the figure, then the customer and his account can be blocked.

Figure 15:
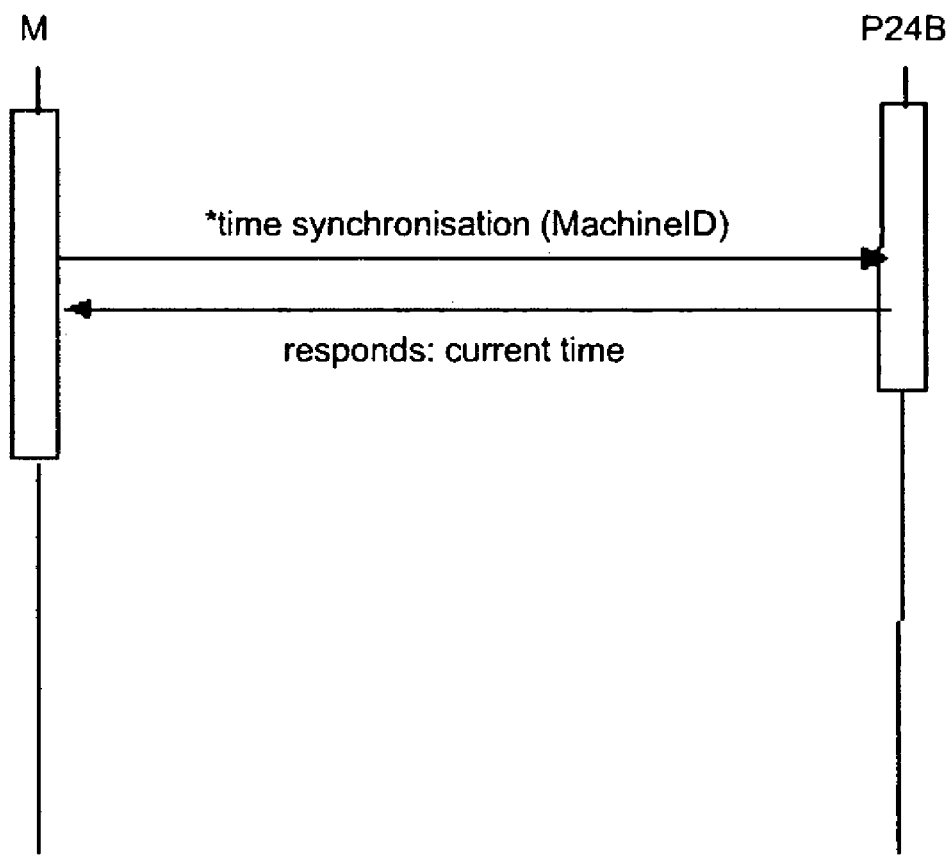
FIG. 15—the communication sequences during the time synchronization.

The communication sequence shown in FIG. 15 describes the sequences during the time synchronization between the parcel compartment system and the central data processing unit.

Figure 16:
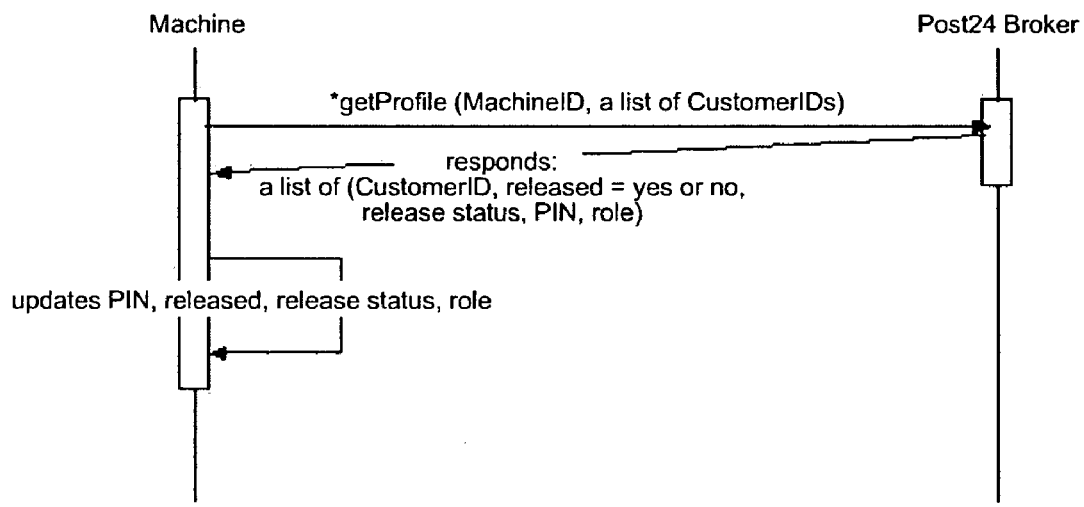
FIG. 16—the communication sequences during the checking of the validity of profiles.

The communication sequence shown in FIG. 16 describes the sequences during the checking of the validity of a customer profile. Through these sequences, the communication device of the parcel compartment system is informed about the latest data such as, for example, about PIN changes or blocking/unblocking of customer accounts.

Figure 17:
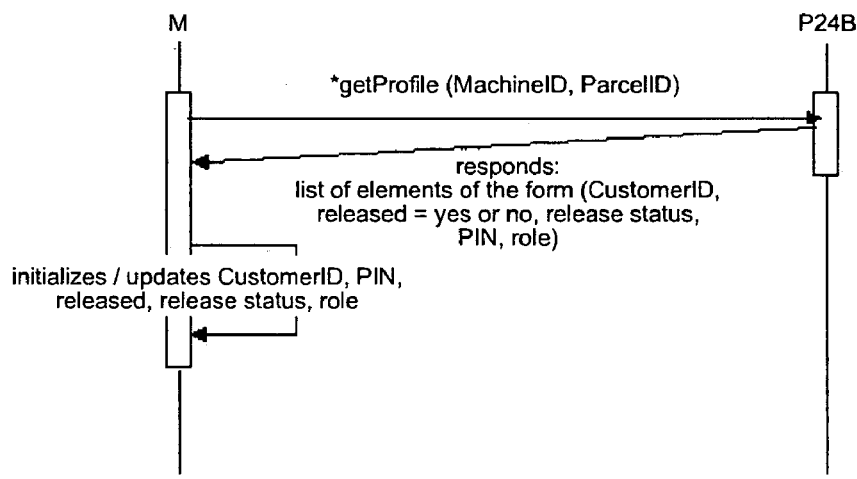
FIG. 17—the communication sequences during the checking of the validity of recipient information.

The communication sequence shown in FIG. 17 describes the sequences during the checking of the validity of recipient information. Through these sequences, the communication device of the parcel compartment system is informed, for example, that a customer has appointed a substitute recipient for the pick-up once the parcel has already been deposited.

Figure 18:
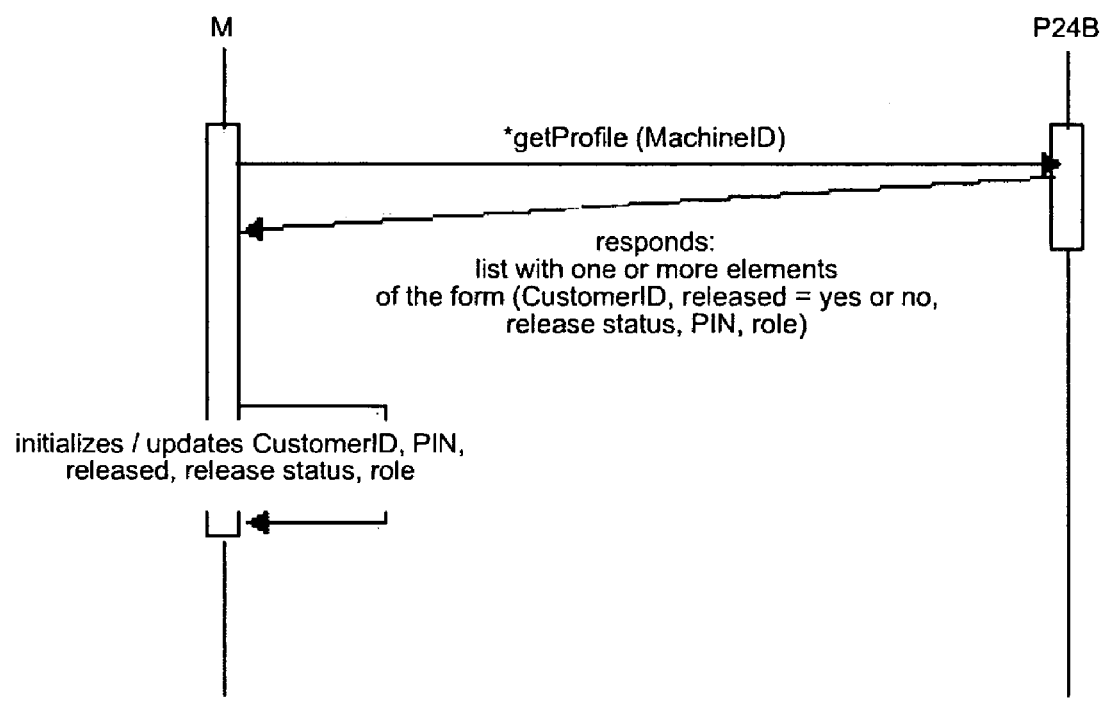
FIG. 18—the communication sequences during the downloading of user profiles.

The communication sequence shown in FIG. 18 describes the sequences during the downloading of a user profile and a delivery agent profile from the central data processing unit 30 to the communication device 21. Here, for example, the CustomerID, release status, PIN and role, e.g. delivery agent profiles, can be loaded into the parcel compartment system.

Figure 19:
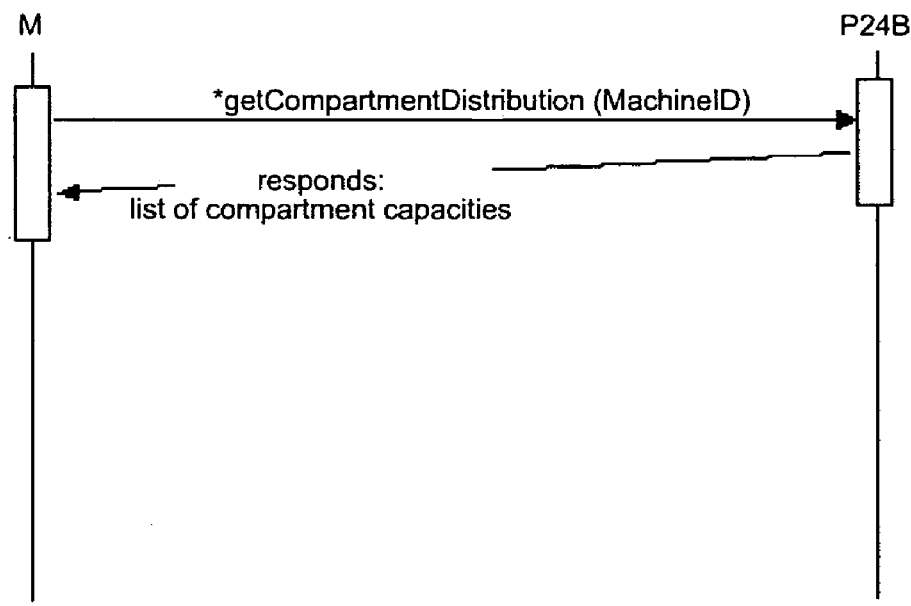
FIG. 19—the communication sequences during the query about the filling status of compartments by logistic providers.

The communication sequence shown in FIG. 19 describes the sequences during the query of the current compartment capacities for a logistic provider. Such logistic providers have a certain number of compartments of a certain size in the parcel compartment systems. With this function message, the communication device 21 is enabled to retrieve a list of the compartment capacities.

Figure 20:
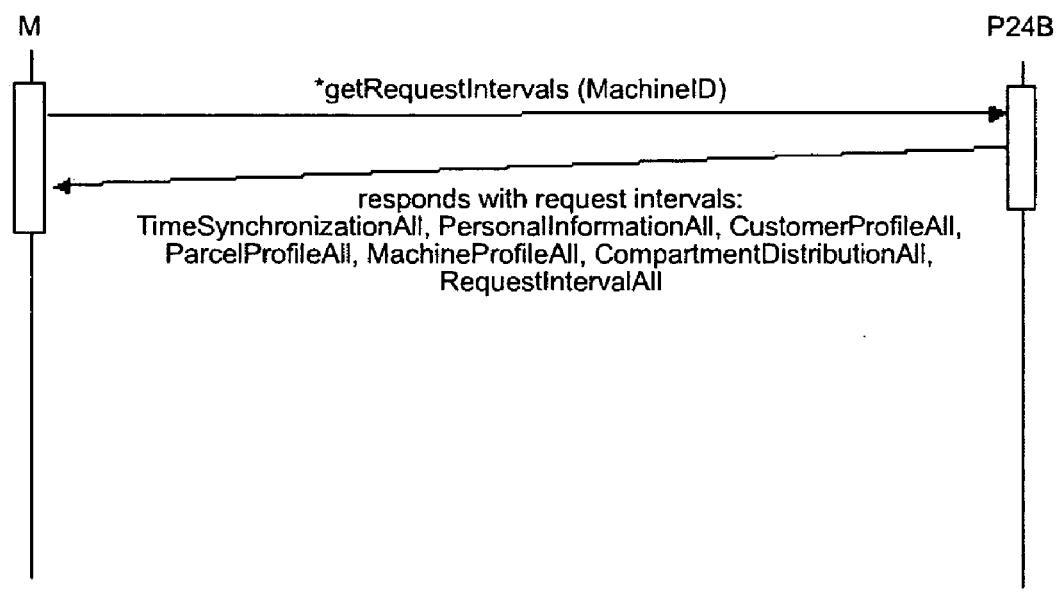
FIG. 20—the communication sequences during the query of request intervals.

The communication sequence shown in FIG. 20 describes the sequences during the query of request intervals, whereby the central data processing unit responds to a function message with the MachineID of the communication device 21, for example, with the following request intervals: time synchronization, personal data, CustomerID, ParcelID, machine profile, compartment distribution and request intervals.

The expiration of the individual time intervals, in addition to the drop-off and pick-up procedures, likewise constitutes an event that the communication device 21 of the parcel compartment system evaluates, on the basis of which it sends a corresponding function message to the central data processing unit.

If a function message is not answered within a certain period of time, the sender has to send the request once again. In order to ensure the correct execution of repeated requests on the sender and recipient side, an unambiguous RequestID is associated with each request. This identification is sent, for instance, with the XML file. The same identification then has to be sent with the response XML file of the original recipient. The RequestID gives the sender and the recipient of a request various checking possibilities. For one thing, it can check whether the same function was requested several times. Secondly, a response can be associated with a function message.

LIST OF REFERENCE NUMERALS 10 delivery agent of various logistics companies
20 parcel compartment system
21 communication device of a parcel compartment system
30 central data processing unit
40 user, customer

The invention claimed is:

1. A method for data transmission between a parcel compartment system and at least one remote data processing unit for operating at least one parcel compartment system having a communications device, the method comprising the steps of collecting events at a parcel compartment system by the communication device, whereby the events at the parcel compartment system comprise depositing and/or picking-up shipments and/or the expiration of time intervals, the communication device associating function messages with the events, combining the function messages into one single request and transmitting the request to the remote data processing unit, whereby each request is provided with an unambiguous RequestID, the remote data processing unit executing functions corresponding to the function messages depending on the transportation or delivery company or user affected by the event and, if applicable, sending data back to the communication device.

2. The method of claim 1, comprising the communications device sending the RequestID with the request to the remote data processing unit, and sending the response to the request back with this RequestID.

3. The method of claim 1, comprising the remote data processing unit confirming each function message with a status code that indicates the success or failure of the function message.

4. The method of claim 3, comprising the communications device repeating the function message if the remote data processing unit has not sent back a status code within a certain period of time.

* * * * *